(12) United States Patent
Pfeffer et al.

(10) Patent No.: US 11,408,497 B2
(45) Date of Patent: Aug. 9, 2022

(54) SHIFT ACTUATORS, DIFFERENTIAL LOCK, DISTRIBUTOR GEARBOX, SHIFT GEARBOX AND AXLE CONNECTION

(71) Applicant: ZF Friedrichshafen AG, Friedrichshafen (DE)

(72) Inventors: Andreas Pfeffer, Bernried (DE); Franz Reitinger, Esternberg (AT)

(73) Assignee: ZF Friedrichshafen AG, Friedrichshafen (DE)

( * ) Notice: Subject to any disclaimer, the term of this patent is extended or adjusted under 35 U.S.C. 154(b) by 23 days.

(21) Appl. No.: 16/480,694

(22) PCT Filed: Jan. 2, 2018

(86) PCT No.: PCT/EP2018/050022
§ 371 (c)(1),
(2) Date: Jul. 25, 2019

(87) PCT Pub. No.: WO2018/137896
PCT Pub. Date: Aug. 2, 2018

(65) Prior Publication Data
US 2019/0390754 A1    Dec. 26, 2019

(30) Foreign Application Priority Data

Jan. 30, 2017   (DE) ................... 10 2017 201 411.3

(51) Int. Cl.
*F16H 48/32*   (2012.01)
*F16H 61/30*   (2006.01)
(Continued)

(52) U.S. Cl.
CPC ............. *F16H 48/32* (2013.01); *F16D 11/10* (2013.01); *F16D 25/082* (2013.01); *F16H 61/30* (2013.01); *F16H 63/3023* (2013.01)

(58) Field of Classification Search
None
See application file for complete search history.

(56) References Cited

U.S. PATENT DOCUMENTS 2,803,149 A * 8/1957 Pringle ................... F16H 48/08
                                                             475/86
3,460,404 A * 8/1969 Schmid ................... F16H 48/22
                                                             475/86
(Continued)

FOREIGN PATENT DOCUMENTS

EP    0 510 457 A1   10/1992
EP    2 290 263 A2    3/2011
JP    S59-164419 A    9/1984

OTHER PUBLICATIONS

Internet: diff-sperre-411-defective-axis-expanding, Mar. 12, 2007, www.unimog-community.de/phpBB3/diff-sperre-411-defekt-achse-ausbauen-t1920.html See German Action.
(Continued)

*Primary Examiner* — Timothy Hannon
(74) *Attorney, Agent, or Firm* — Finch & Maloney PLLC; Michael J. Bujold; Jay S. Franklin

(57) ABSTRACT

A shift module (1) for a differential lock (7), a shift gearbox or an axle connection. The shift module has a shift sleeve (2) and a shift piston (4) which is designed as a ring piston (4). The shift module is mounted in one of a respective differential lock, a respective distribution gearbox, and a respective axle connection.

14 Claims, 3 Drawing Sheets

(51) Int. Cl.
    *F16H 63/30*     (2006.01)
    *F16D 25/08*     (2006.01)
    *F16D 11/10*     (2006.01)

(56) References Cited

U.S. PATENT DOCUMENTS

| | | | |
|---|---|---|---|
| 4,549,449 A | | 10/1985 | Miller et al. |
| 5,335,764 A | | 8/1994 | Leitner et al. |
| 5,377,800 A | | 1/1995 | Sperduti et al. |
| 5,582,557 A | * | 12/1996 | Dissett .............. F16H 48/22 |
| | | | 475/231 |
| 7,211,017 B2 | * | 5/2007 | Green .............. B60K 17/16 |
| | | | 192/85.18 |
| 7,527,575 B2 | * | 5/2009 | Salg .............. F16H 48/30 |
| | | | 475/231 |
| 2003/0224896 A1 | * | 12/2003 | Chung .............. F16H 48/34 |
| | | | 475/231 |
| 2007/0293364 A1 | * | 12/2007 | Correia .............. F16H 48/08 |
| | | | 475/300 |
| 2011/0269593 A1 | * | 11/2011 | Knowles .............. B60K 17/35 |
| | | | 475/84 |

OTHER PUBLICATIONS

Hinterachsdifferentialsperre, Jan. 4, 2006, http://allrad-lkw-gemeinschaft.de/phpBB3/viewtopic.php?f=33&t=5186&statr=0 See German Action.
German Action Corresponding to 10 2017 201 411.3 dated Dec. 19, 2017.
International Search Report Corresponding to PCT/EP2018/050022 dated Apr. 20, 2018.
Written Opinion Corresponding to PCT/EP2018/050022 dated Apr. 20, 2018.

* cited by examiner

SHIFT ACTUATORS, DIFFERENTIAL LOCK, DISTRIBUTOR GEARBOX, SHIFT GEARBOX AND AXLE CONNECTION

This application is a National Stage completion of PCT/EP2018/050022 filed Jan. 2, 2018, which claims priority from German patent application serial no. 10 2017 201 411.3 filed Jan. 30, 2017.

FIELD OF THE INVENTION

The invention concerns a shift actuator for a differential lock, for a shift gearbox, or for an axle connection, as well as a respective differential lock, a respective distributor gearbox, a respective shift gearbox and a respective axle connection.

BACKGROUND OF THE INVENTION

Known through the state of the art are differential locks which are in particular used in drive trains of motor vehicles. These differential locks allow, through a blocking of the distribution function of the respective differential gearbox, an even distribution of the drive torque at the drive in axles or the driven vehicle wheels, respectively, which can in particular in rough terrain make the driving easier. Also, axle connections are known which enable the drive or drag of selected vehicle axles. In the driven condition of the vehicle axle, the all-terrain drive as well as a traction ability of the vehicle increases, whereas the gasoline consumption is reduced in a drag condition of the motor vehicle axle. Also, known from the state of the art are the different embodiments of shift gearboxes, whereby such a shift gearbox has usually a multitude of gear steps. Each of the gear steps defines a certain gear ratio of the transmission input rotational speed compared to the transmission output rotational speed. Thus and at each driven speed of the vehicle, the matching gear step can be selected. The engagement or disengagement, respectively, of the differential lock or the engagement or disengagement of the axle connection, as well as the shifting of the gear steps hereby take place through a suitable shift actuator system which usually has a shift fork, a shift sleeve, a shift rod as well as a shift piston, and a shift cylinder.

In this context, EP 0 510 457 B1 describes a form-fit clutch or a distribution gearbox of a motor vehicle and a method for its activation. The clutch configuration, which is designed as a claw clutch, has on one hand a driving clutch part which is in communication with the drive train and a wheel drive train, and has on the other hand a driven clutch part which is connected with a wheel drive train which has to be activated, and which is designed as a shift sleeve, to be moved through an engagement part by means of a shift fork. The engagement part has a piston with a piston rod and a fluid cylinder. The shift fork is mounted at the front end of the shift fork. The piston is on one side impinged with a fluid while the compression spring supports itself on the other side. While in the resting position, the shift fork is pressed into a first direction by the compression spring and moves the clutch into the disengaged condition. The engaged condition of the clutch is accomplished through a respective pressure impact at the piston rod and moves the piston rod into a second direction until the clutch parts are connected with each other in a form-locking manner.

The known shift actuators have disadvantages for various reasons. They usually have a large number of individual parts, which is comparatively complicated in terms of production as well as assembly. Furthermore, they result in comparatively higher weight or masses, respectively, for the shift actuator configurations which have to be accelerated or decelerated in each shift execution. Finally, the known shift actuator configurations need to be extensively calibrated regarding the tooth crest-tooth crest distance in the de-activated stage and the tooth crest-tooth base distance in the activated stage. Otherwise, undesired friction can occur between the shifting piston and the shift fork in the activated stage, whereas grinding noises or longer shift times can occur during the deactivated stage.

SUMMARY OF THE INVENTION

It is the object of the present invention to propose an improved shift actuator configuration for a differential lock, or a shift gearbox, or an axle connection.

This object is solved in accordance with the invention for a differential lock, for a shift gearbox, or for an axle connection in accordance with the independent claim(s). Advantageous embodiments for additional designs of the invention are part of the dependent claims.

The invention concerns a shift actuator configuration for a differential lock, for a shift gearbox, or for an axle connection, comprising a shift sleeve and the shift piston. The inventive shift actuator configuration is characterized by the fact that the shift piston is designed as a ring piston.

By designing the shift piston as ring piston, the ring piston can be directly and advantageously positioned on a transmission shaft, on which also the shift sleeve itself is positioned. It is especially preferred, if the shift piston is hereby coaxially positioned on the transmission shaft. By positioning both the shift piston and the shift sleeve on the shaft, a shift rod which is generally positioned in parallel to the transmission shaft with the shift sleeve, and on which the shift piston is generally positioned together with the shift fork, can be advantageously omitted. This saves structure space, weight, and cost.

By allowing the positioning of the piston on the transmission shaft, in particular the coaxial positioning on the transmission shaft, another advantage arises in that the shift fork can also be omitted completely. This leads to the situation that the weight as well as the manufacturing cost of the shift module can be saved, as well as the shift timing can be minimized and the amount of different part of the shift module can be reduced.

The inventive shift module is equally suitable for the shifting of a differential lock, as well as for the shifting of a manual transmission of a motor vehicle, or for the actuation of an axle connection of a vehicle transmission.

Preferably, it is foreseen that the shift piston is unilaterally applied with pressure. When reaching the engagement pressure, actuation of the shift module takes place in a way that the differential lock is engaged, a gear step of a shift gearbox is engaged, or an axle connection is engaged. However, in a no-pressure condition, the differential lock or the gear step of the shift gearbox to be shifted, respectively, or the axle connection, respectively, are preferably disengaged.

Alternatively, it is preferred provided that the differential lock or the gear step of the gearbox to be shifted, respectively, or the axle connection are disengaged in an unpressurized condition. The engagement occurs in this case by pressurizing the shift piston with the engagement pressure.

Also alternatively preferred, the shift piston divides a shift cylinder of the shift actuator configuration into a disengagement space and an engagement space, wherein the disengagement space accommodates the disengagement pressure and the engagement space accommodates the engagement pressure. In this case it is a double-acting shift cylinder.

The shift piston is moved axially on the transmission shaft during actuation of the shift module.

The shift sleeve and the shift piston are made preferably of metal, in particular steel. This guarantees a comparatively large robustness and therefore longevity of the parts under frequent and large loads.

According to a preferred embodiment of the invention, it is provided that the shift sleeve is rotatably mounted axially in the shift piston. Through this configuration of the shift sleeve in the shift piston, the advantage arises that the shift piston, during a pressure application which leads to axial displacement of the shift piston on the shift rod, can take along the shift sleeve and it can also be shifted. Since the shift sleeve is also pivotally mounted in the shift piston, the ability of the shift sleeve to rotate in reference to the shift piston is guaranteed. Since the shift sleeve, in the engaged position, follows rotation of shift sleeve which is engaged with the gear or the assigned shaft, respectively, the shift piston can stay at rest due to the rotatability. This simplifies the production of a reliable pressure tightness of the shift piston relative to the shift cylinder, because the shift piston does not rotate in reference to the shift cylinder.

It is preferably provided that the shift sleeve is mounted coaxially in the shift piston. Thus no tilting torques are created between the shift piston and the shift sleeve during pressurization of the shift piston or upon a activation of the shift sleeve.

It is provided in an especially preferred embodiment of the invention that the shift sleeve is mounted in the shift piston by means of a slide bearing. This represents a cost-effective and technically reliable way to ensure the rotatability of the shift sleeve against the shift piston.

It is provided in an alternative, especially preferred embodiment of the invention that the shift sleeve is positioned in the shift piston by means of a roller bearing. Compared to a slide bearing, the roller bearing is more costly but can achieve comparably lower friction results and therefore a better efficiency. Another advantage is hereby that the exact position of the shift piston in reference to the shift sleeve is predetermined by the roller bearing so that time-consuming work for the adjustment of the tooth crest-tooth crest distance, as well as the tooth crest-tooth base distance, can be eliminated. A necessary preload for the roller bearing is preferably created through an elastic resetting element, which moves the shift piston in a no-pressure condition into the idle condition.

The roller bearing is preferably designed as angular ball bearing, as groove ball bearing, or as axial bearing.

It is provided, in accordance with an additional, preferred embodiment of the invention that the shift module has also a shift cylinder which is designed to apply pressure at the shift piston. Shift cylinders for the pressure application, and thus for the actuation of shift pistons, are very popular and also technically mature. The shift cylinder can be designed, for instance for the actuation of the shift piston by means of oil or by means of air. The shift cylinder can also be designed as single or double-acting.

It is provided in accordance with an especially preferred embodiment of the invention that the shift module has also an elastic resetting element which is designed to apply at the shift piston, which is under pressure, and opposite force. Thus, the shift piston is moved into a defined resting position when the pressure application stops, without any additional effort.

It is preferably provided that the resetting element is designed as coil spring or plate spring. Coil springs and plate springs are inexpensive and can be procured in nearly any desired design.

The coil spring or plate spring, respectively, are preferably biased with pressure.

The resetting element is supported on the shift sleeve. Since the shift sleeve is positioned radially within the shift piston, the resetting element, in particular in a design as coil spring or plate spring, respectively, can be designed as weight and material saving with a comparatively small radial circumference.

It is provided in accordance with an additional, preferred embodiment of the invention that the shift module has also a front piston stop and a rear piston stop. The front piston stop limits movement of the shift piston in a first axial direction, and the rear piston stop limits the movement of the shift piston in a second axial direction. This results in the advantage that the exact position of the shift piston is specified for the shift sleeve on the front and the rear piston stop, so that even in this case, time-consuming work for the adjustment of tooth peak-tooth peak distance, as well as tooth peak-tooth base distance, can be eliminated.

When a roller bearing is used, the fallback to the front piston stop or the rear piston stop, respectively, is not necessary because the roller bearing, as previously stated, defines already the exact position of the shift piston in reference to the shift sleeve.

It is provided in accordance with an additional, preferred embodiment of the invention that the shift piston has two different, stepped radial outer circumferences. It simplifies the positioning of the shift piston in the transfer gearbox, in the shift transmission, or in the axle connection, because the shift piston during the installation can be inserted into the opening provided for the accommodation so far until the larger of its two radial perimeters touches another part which indicates its target position.

It is preferably provided that at each of the two different outer perimeters of the shift piston a seal element, in particular an O-ring, is positioned. Since the shift piston is preferably actuated by fluid, sealing for the fluid can be accomplished in a simple way.

The invention also concerns a transfer gearbox with a differential lock to block a distribution function of the transfer gearbox, whereby the differential lock can be engaged or disengaged by means of a shift module. The inventive transfer gearbox characterizes that at least the one shift module is a shift module according to the invention.

The invention also conserves a shift transmission with shiftable gear steps, whereby the gear steps can be shifted by means of at least one shift module. The inventive shift transmission is characterized that at least the one shift module is a shift module according to the invention.

The invention concerns finally also an axle connection whereby the axle connection can be engaged or disengaged by means of the shift module. The invented axle connection is characterized by the fact that at least one shift module is a shift module according to the invention.

BRIEF DESCRIPTION OF THE DRAWINGS

The invention will be explained by way of example with reference to embodiments shown in the figures.

These show.

DETAILED DESCRIPTION OF THE PREFERRED EMBODIMENTS

Figure 1:
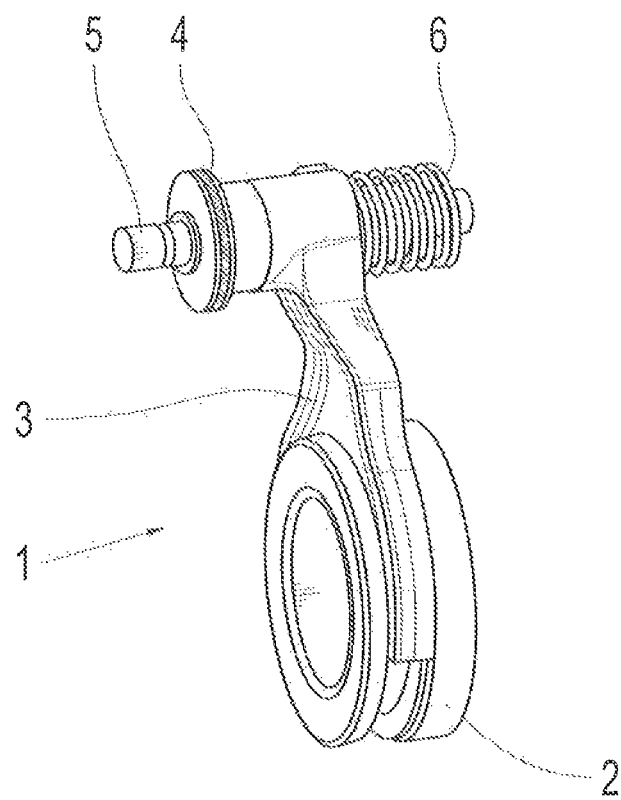
FIG. 1 by way of example and schematically a known shift module.

Same parts, functional units, and comparable components are marked with the same reference characters in all drawings. These parts, functional units and comparable components are, based on their technical characteristics, identically presented, unless the description mentions anything different explicitly or implicitly.

FIG. 1 shows exemplary and schematically a known shift module 1, comprising of a shift sleeve 2, a shift fork 3, a shift piston 4, a shift rod 5, as well as a resetting element 6. The shift piston 4 is positioned in a not-shown shift cylinder which allows actuation of the shift piston 4 by means of pneumatic pressure, meaning axial shifting of the shift piston 4 on the shift rod 5. The pressurization takes place against a restoring force of the resetting element 6, which is formed, for example, as a helical spring 6. Since the shift piston 4 and the shift fork 3 are mechanically rigidly connected, the shift fork 3 follows the axial shifting of the shift piston 4. In addition, because the shift fork 3 is axially fixed, but rotatably connected with the shift sleeve 2, the shift fork 3 transfers axial shifting of the shift piston 4 to the shift sleeve 2. Thus, the shift sleeve 2 can be engaged or disengaged, respectively, by actuation of the shift piston 4. The construction of this known shift module 3 is insofar disadvantageous because many different parts are comparably needed which again leads to comparatively greater manufacturing costs and to comparably larger masses to be moved.

Figure 2:
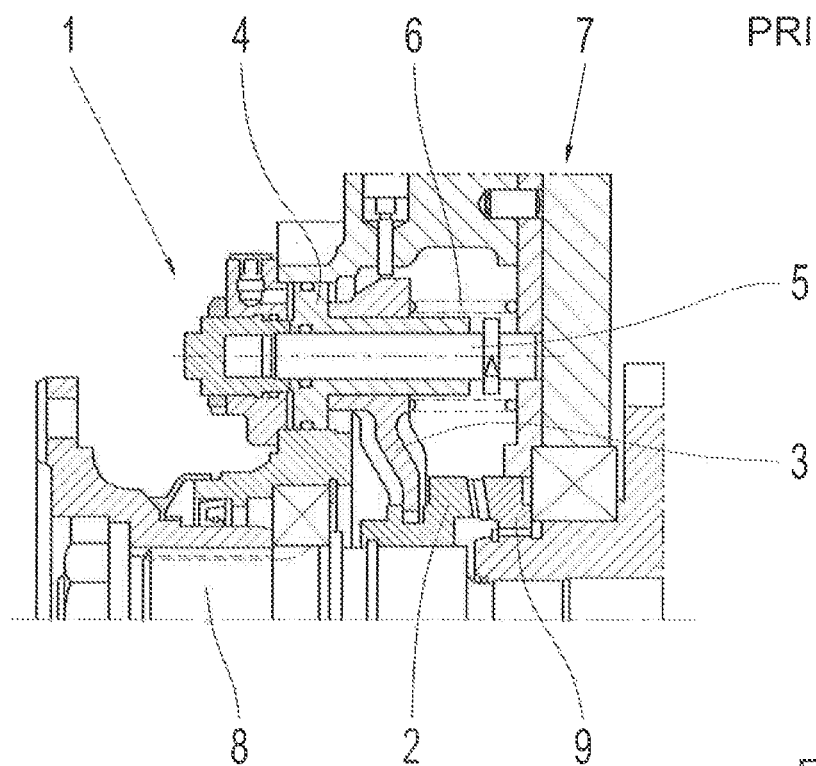
FIG. 2 by way of example and schematically a known shift module with a differential lock, FIG. 3 by way of example and schematically a possible embodiment of a shift module according to the invention, FIG. 4 by way of example and schematically a shift module according to the invention in a differential lock, FIG. 5 by way of example and schematically an additional possible embodiment of a shift module according to the invention, and FIG. 6 by way of example and schematically an additional possible embodiment of a shift module according to the invention in a differential lock.

FIG. 2 shows by way of example and Schematically a known shift module 1 with a differential lock 7, as presented in FIG. 1. As it can be seen, the shift module 1 requires, due to its known construction, in comparison much construction space in the transfer gearbox 7. This is mainly due to the parallel configuration of the shift fork 5 with a transmission shaft 8, on which the shift sleeve 2 is positioned. In addition, the known transfer gearbox 7, as shown in FIG. 2, requires the calibration of the distance of the tooth peaks of the gearing of the shift sleeve 2 in reference to the tooth peaks of a gear 9 in the disengage condition, as well the calibration of the distance of the tooth peaks end of the gearing of the shift sleeve 2 to the tooth base bottom of the gearing of a gear 9 in the engaged condition. Otherwise, an unwanted large friction can occur in the engaged condition between the shift piston and the shift fork, whereby during the disengage condition grinding noise or longer shift timing might occur. Such calibration procedures require time and are therefore costly.

Figure 3:
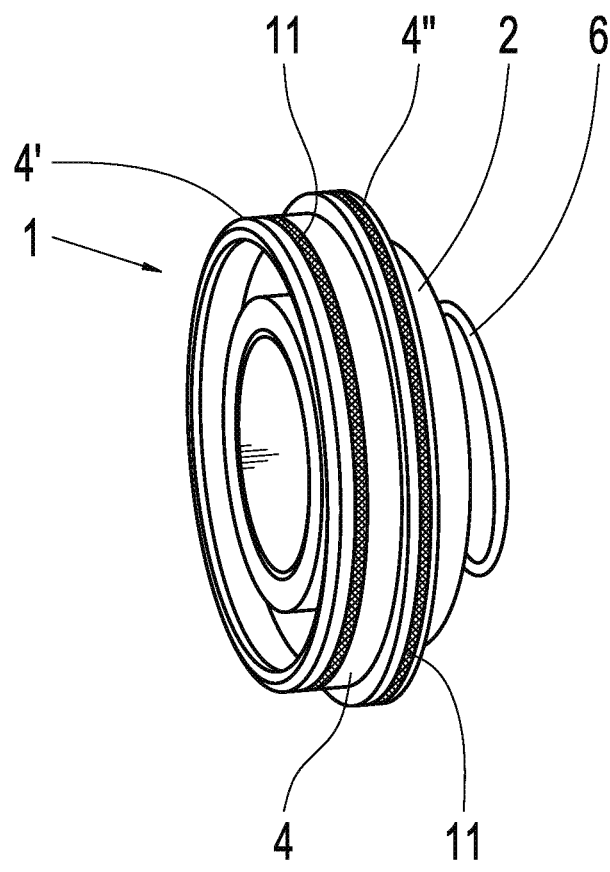
Figure 4:
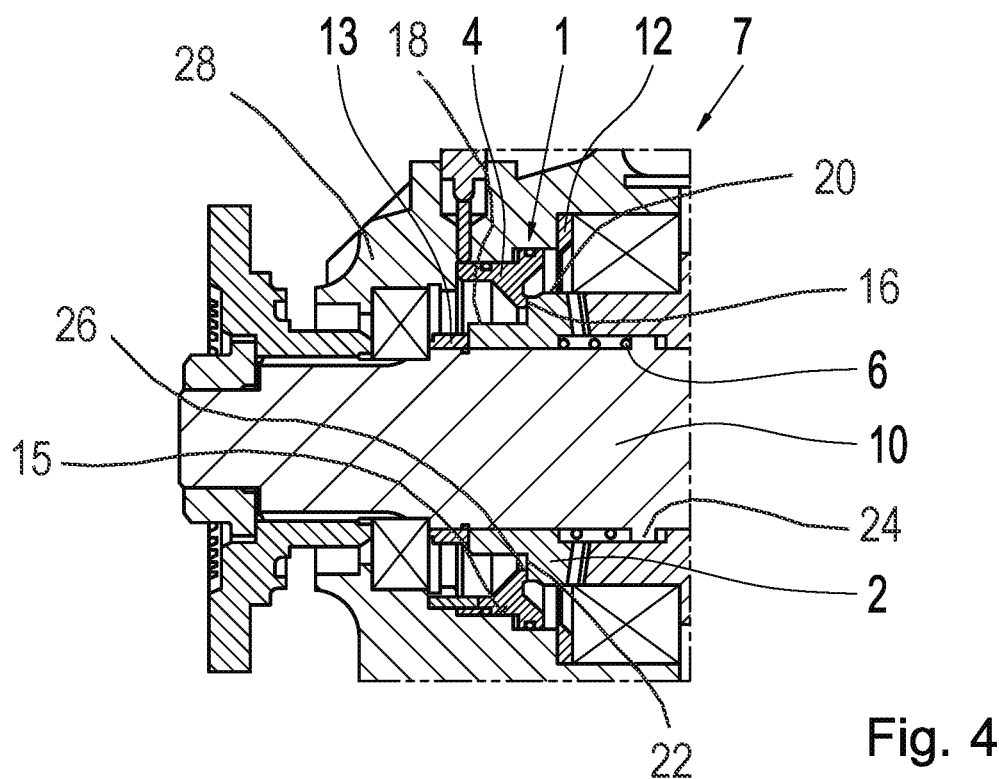

FIGS. 3 and 4 show by way of example and schematically a possible embodiment of a shift module 1 according to the invention which is equally suitable for application in a differential lock, a shift gearbox, or an axle connection. The shift module 1 comprises a shift sleeve 2, a resetting element 6, and a shift piston 4 which are arranged within a radially inner surface of a housing 28. The radially inner surface of the housing 28 defining a shift cylinder 15, the shift piston 4 is designed as a ring piston 4. With the construction as a ring piston 4, the shift piston 4 can be directly positioned within the shift cylinder 15 on a transmission shaft 10 within the housing 28. The shaft 10 is formed with a projection 24 that extends radially outward from the shaft and the projection 24 is permanently formed from the same material and as an integral part of the shaft 10. The use of a shift rod 5 and a shift fork 3 is therefore advantageously not needed, so that material, manufacturing cost and weight can be saved. The shift sleeve 2 is by way of example rotatably mounted in the shift piston 4 by means of a slide bearing 16 (diagrammatically shown in FIG. 4). A slide bearing can be comparably cost-effectively manufactured. The resetting element 6 is designed as a coil spring 6 and acts on the shift piston 4 permanently with a force which counteracts a pressure force which is created to actuate the shift piston 4. As it can be seen further, the shift piston 4 has a smallest inner perimeter 26 and two different and stepped radial outer perimeters 4', 4" which allow a simple positioning or installation of the shift piston 4 in a differential lock, a gearshift, or in an axle connection. In addition, the shift piston 4 has in each outer perimeter 4', 4" a seal element 11 in each case, designed as an O-ring 11, to prevent possible pressure losses through leakages during the actuation of the shift piston 4. The shift sleeve 2 has different first and second outer perimeters 18, 20 with a step 22 formed between the first and second outer perimeters of the shift sleeve 2 with the first outer perimeter 18 being smaller in diameter than the second outer perimeter 20. The smallest inner perimeter 26 of the shift piston 4 is larger than at least the smaller first outer perimeter 18 of the shift sleeve 2 with a gap formed therebetween.

FIG. 4 shows by way of example and schematically, the shift module 1 in a differential lock 7, as described in FIG. 3. As can be seen, the shift module 1 is mounted in space-saving manner on the transmission shaft 10. To simplify the calibration of tooth head-tooth head distance in the disengaged condition, as well as the tooth head-tooth base distance in the engaged condition, the front piston stop 12 and the rear piston stop 13 are provided, which mechanically limit the shifting of the shift piston 4 or the shift sleeve 2.

Figure 5:
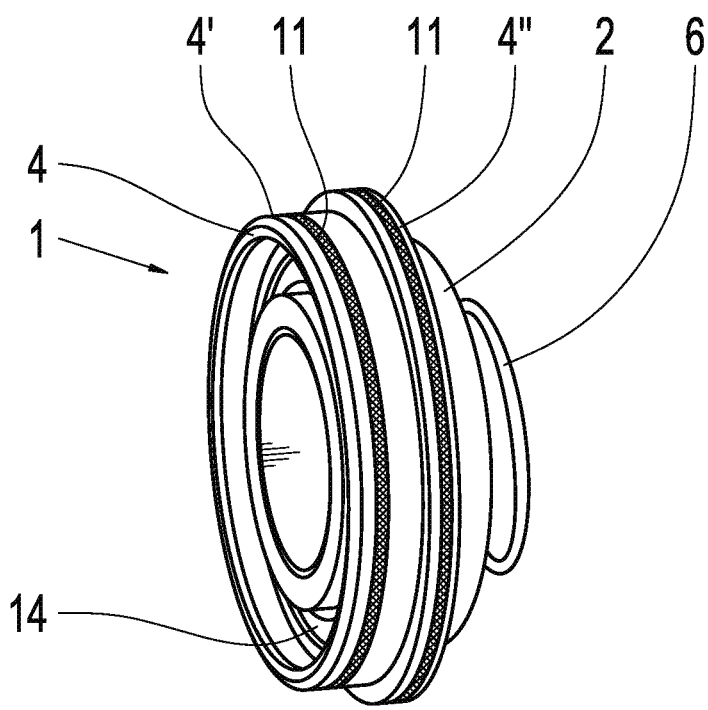

FIG. 5 shows by way of example and schematically, an additional possible embodiment of the shift module 1 according to the invention which only differs from the shift module 1 in FIG. 3 in that it has, instead of a slide bearing, a roller bearing 14 which as an example is designed as a groove ball bearing 14. The resetting element 6 pre-loads the groove ball bearing 14 in both the engaged and in the disengaged condition of the shift module 1.

Figure 6:
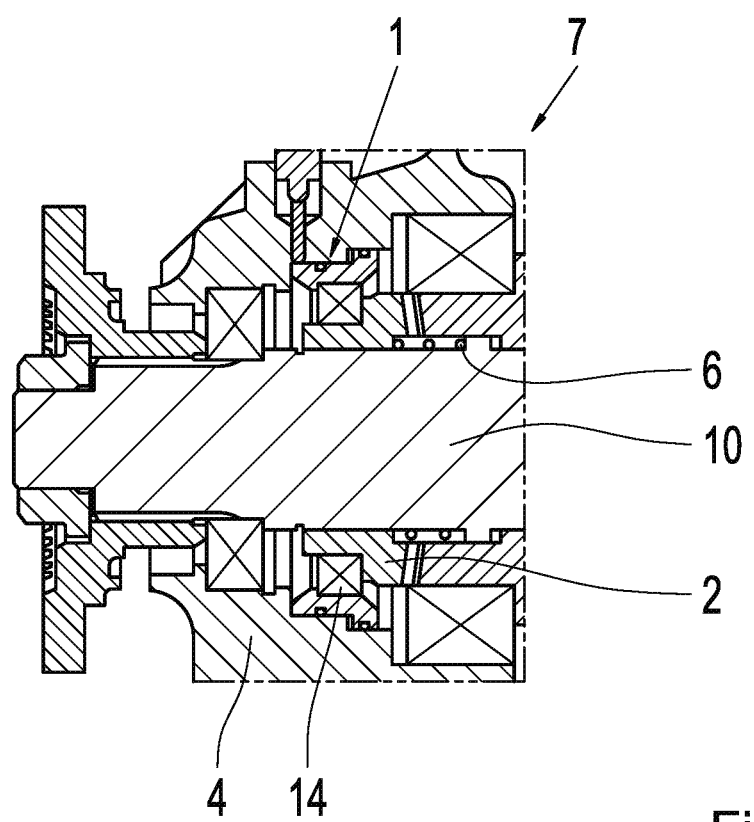

FIG. 6 shows by way of example and schematically, the shift module 1 as described in FIG. 5 in a differential lock 7. Since the shift module 1, in this case, has a roller bearing 14 instead of a slide bearing, the front piston stop 12 and the rear piston stop 13 can be advantageously omitted. Instead, necessary calibration occurs through the roller bearing 14.

REFERENCE CHARACTERS

1 Shift Module
2 Shift Sleeve
3 Shift Fork
4 Shift Piston
4', 4" Outer Perimeters of the Shift Piston
5 Shift Fork 6 Resetting Element, Coil Spring
7 Differential Lock
8 Transmission Shaft
9 Gear
10 Transmission Shaft
11 Seal Element, O-Ring
12 Front Piston Stop
13 Rear Piston Stop
14 Roller Bearing, Grooved Ball Bearing

The invention claimed is:

1. A shift module for one of a differential lock, a shift gearbox or an axial connection, the shift module comprising:
a shift sleeve being slidably mounted on a shaft and axially slidable along the shaft in a first axial direction, into a disengaged position, and in an opposite second axial direction, into an engaged position, the shift sleeve having different first and second outer perimeters with a step formed between the first and the second outer perimeters of the shift sleeve with the first outer perimeter being smaller in diameter than the second outer perimeter,
the shaft being formed with a projection that extends radially outward from the shaft and the projection being permanently formed from the same material and as an integral part of the shaft,
a shift piston being designed as ring piston, the shift piston having different first and second outer perimeters with a step formed between the first and the second outer perimeters of the shift piston, each of the first and the second outer perimeters of the shift piston supporting a radially outward facing seal element which prevents pressure losses during actuation of the shift piston, the shift piston having a radially innermost perimeter, the seal elements of the first and the second outer perimeters of the shift piston mate with a radially inner surface of a housing in which the shift sleeve, the shaft and the shift piston are arranged, the radially inner surface of the housing defining a shift cylinder, the shift piston being coaxially arranged with the shift sleeve and the shaft, and the shift piston being rotationally fixed relative to the shift cylinder, and the radially innermost perimeter of the shift piston radially overlapping and being larger than at least the smaller first outer perimeter of the shift sleeve with a gap formed therebetween, and
an elastic resetting element is arranged radially between the shift sleeve and the shaft, the elastic resetting element extends axially and has a first axial end that abuts the shift sleeve and an opposite second axial end that abuts against the projection of the shaft such that the elastic resetting element constantly applies a force on the shift sleeve in the first axial direction such that the shift sleeve slides toward the disengaged position.

2. The shift module according to claim 1, wherein the shift sleeve is rotatably mounted axially within the shift piston.

3. The shift module according to claim 2, wherein the shift sleeve is mounted in the shift piston by a slide bearing.

4. The shift module according to claim 2, wherein the shift sleeve is mounted in the shift piston by a roller bearing, the roller bearing being located radially between the shift piston and the shift sleeve such that the roller bearing radially separates the shift piston at a distance away from the shift sleeve.

5. The shift module according to claim 2, wherein a roller bearing is mounted on the shift sleeve and the shift piston is mounted on the roller bearing, the roller bearing being arranged radially between the shift sleeve and the shift piston such that the roller bearing and the shift piston are radially spaced from each other by the roller bearing.

6. The shift module (1) according to claim 1, wherein the shift piston has a radially inner facing surface, and the shift sleeve has a radially outer facing surface, a roller bearing abuts the inner facing surface of the shift piston and the outer facing surface of the shift sleeve such that the shift sleeve is rotatable relative to the shift piston.

7. The shift module according to claim 6, wherein the force applied on the shift sleeve in the first axial direction by the elastic resetting element is applied on the shift piston and is counter to either a hydraulic pressure or a pneumatic pressure applied on the shift piston.

8. The shift module according to claim 1, wherein the shift module has a front piston stop and a rear piston stop, the front piston stop directly contacts an axial end surface of the shift piston, which faces the second direction, to stop sliding of the shift piston and the shift sleeve in the second axial direction at the engaged position of the shift sleeve, and the rear piston stop contacts the shift sleeve to stop sliding of the shift sleeve in the first axial direction at the disengaged position.

9. The shift module according to claim 1, wherein the first and the second outer perimeters of the shift piston form a radially outer surface of the shift piston that defines an entire axial extent of the shift piston.

10. The shift module according to claim 1, wherein the shift module is configured to engage and disengage the differential lock, and the shift piston and the shift sleeve are coupled such that the shift sleeve is rotatable relative to the shift piston, the shift piston and the shift sleeve are axially fixed relative to each other such that axial movement of the shift piston in the second axial direction biases the shift sleeve to the engaged position in which the shift sleeve engages the differential lock to block a distribution function of a transfer gearbox, and movement of the shift sleeve in the first axial direction disengages the differential lock.

11. The shift module according to claim 1, wherein the shift module is configured to be connected to shiftable gear steps of the shift gearbox such that the gear steps are shiftable by actuation of the shift module.

12. The shift module according to claim 1, wherein the shift piston has an axial end surface that faces the second axial direction, and the shift sleeve has an axial end surface that faces the first direction, a front piston stop abutting the axial end surface of the shift piston to limit axial movement of the shift piston in the second axial direction, and a rear piston stop abutting the axial end surface of the shift sleeve to limit axial movement of the shift piston in the first axial direction.

13. A shift module in combination with a transfer gearbox having a differential lock, the shift module having:
a shift sleeve that is mounted on a shaft and is axially slidable along the shaft in a second axial direction to an engaged position and in a first axial direction to a disengaged position, the shaft being formed with a projection that extends radially outward from the shaft,
a shift piston being designed as ring piston, the shift piston having first and second axial end surfaces that define an entire axial extent of the shift piston, the shift piston having a radially outer surface with different first and second outer perimeters and a step formed between the first and the second outer perimeters each of the first and the second outer perimeters supporting a radially outward facing seal element which prevents pressure losses during actuation of the shift piston, the shift piston having a radially innermost perimeter, the seal elements of the first and the second outer perimeters mate with a radially inner surface of a housing which defines a shift cylinder, the shift piston being coaxially arranged with the shift sleeve and the shaft, and the shift piston being rotationally fixed relative to the shift cylinder, and the radially innermost perimeter of the shift piston radially overlapping and being larger than at least the smaller first outer perimeter of the shift sleeve with a gap formed therebetween, an elastic resetting element is arranged radially between the shift sleeve and the shaft, the elastic resetting element extends axially and has a first axial end that abuts the shift sleeve and an opposite second axial end that directly abuts the projection of the shaft such that the elastic resetting element applies a force on the shift sleeve in the first axial direction to continually bias the shift sleeve toward the disengaged position, the shift sleeve in the engaged position engages the differential lock and the shift sleeve in the disengaged position disengages the differential lock, the differential lock being engaged by the shift module to block a distribution function of the transfer gearbox, and the shift module has a front piston stop and a rear piston stop, the front piston stop contacts the second axial end surface of the shift piston to limit movement of the shift piston and the shift sleeve in the second axial direction in the engaged position of the shift sleeve, the rear piston stop contacts the shift sleeve and the first axial end surface of the shift piston contacts a radially extending surface of the shift cylinder to limit movement of the shift sleeve in the first axial direction in the disengaged position.

14. A shift module in combination with an axle connection, the shift module having:

a shift sleeve being slidably mounted on a shaft and is axially slidable along the shaft in a first axial direction, into a disengaged position, and in an opposite second axial direction, into an engaged position, the shift sleeve in the engaged position engages the axle connection, and the shift sleeve in the disengaged position disengages the axle connection, the shift sleeve having different first and second outer perimeters with a step formed between the first and the second outer perimeters of the shift sleeve with the first outer perimeter being smaller in diameter than the second outer perimeter, the shaft being formed with a projection that extends radially outward from the shaft and the projection being permanently formed from the same material and as an integral part of the shaft, a shift piston being designed as ring piston, the shift piston having different first and second outer perimeters with a step formed between the first and the second outer perimeters, each of the first and the second outer perimeters of the shift piston supporting a radially outward facing seal element which prevents pressure losses during actuation of the shift piston, the shift piston having a radially innermost perimeter, the seal elements of the first and the second outer perimeters of the shift piston mate with a radially inner surface of a housing which defines a shift cylinder, the shift piston being coaxially arranged with the shift sleeve and the shaft, and the shift piston being rotationally fixed relative to the shift cylinder, and the radially innermost perimeter of the shift piston radially overlapping and being larger than at least the smaller first outer perimeter of the shift sleeve with a gap formed therebetween, and an elastic resetting element is arranged radially between the shift sleeve and the shaft, the elastic resetting element extends axially and has a first axial end that abuts the shift sleeve and an opposite second axial end that directly abuts against the projection of the shaft such that the elastic resetting element constantly applies a force on the shift sleeve in the first axial direction such that the shift sleeve slides toward the disengaged position, a roller bearing being located radially between the shift piston and the shift sleeve, the roller bearing abuts an inner facing surface of the shift piston and the smaller first outer perimeter of the shift sleeve such that the shift sleeve is rotatable relative to the shift piston.

* * * * *